United States Patent [19]

Horio

[11] Patent Number: 5,363,248
[45] Date of Patent: Nov. 8, 1994

[54] ZOOM LENS DEVICE AND METHOD OF ASSEMBLING THE SAME

[75] Inventor: Motohiko Horio, Omiya, Japan

[73] Assignees: Fuji Photo Optical Co., Ltd., Saitama; Fuji Photo Film Co. Ltd., Kanagawa, both of Japan

[21] Appl. No.: 2,255

[22] Filed: Jan. 8, 1993

[30] Foreign Application Priority Data

Jan. 13, 1992 [JP] Japan .................................. 4-004156

[51] Int. Cl.⁵ ..................... G02B 27/00; G02B 15/22
[52] U.S. Cl. .................................. 359/704; 359/827; 359/900
[58] Field of Search ..................... 359/694–706, 359/507–511, 808–830, 900; 354/286–287, 288 R, 195.1–195.13

[56] References Cited

U.S. PATENT DOCUMENTS

| | | | |
|---|---|---|---|
| 4,318,593 | 3/1982 | Tsuji et al. | 359/706 |
| 4,799,073 | 1/1989 | Asano et al. | 359/700 |
| 5,113,261 | 5/1992 | Morisawa | 359/700 |
| 5,140,468 | 8/1992 | Kayanuma | 359/700 |
| 5,177,638 | 1/1993 | Emura et al. | 359/819 |

Primary Examiner—Loha Ben
Assistant Examiner—Thong Nguyen

[57] ABSTRACT

Guide bars supporting a plurality of lens frames are inserted through the opening formed in a side of a lens housing. The direction of insertion is perpendicular to the optical axis of the lenses supported by the lens frames. The guide bars and lens frames are then arranged at predetermined positions in the lens housing. Then, a cam tube is inserted through the opening in the direction perpendicular to the optical axis. Cam pins formed on the lens frames are then coupled to cam grooves formed in the cam tube.

9 Claims, 3 Drawing Sheets

ZOOM LENS DEVICE AND METHOD OF ASSEMBLING THE SAME

BACKGROUND OF THE INVENTION

1. Field of the Invention

This invention relates to a zoom lens device and a method of assembling the same, and more particularly to a zoom lens device suitable for a video camera and the like and a method of assembling the same.

2. Description of the Related Art

In general, a zoom lens device is constituted by a focus lens group, movable lens groups and a master lens group.

In such a zoom lens device, for example, a zoom ring is rotated and the movable lens groups are moved back and forth in a direction of an optical axis under a predetermined relationship to thereby change the magnification, and a focus ring is rotated and the focus lens group is moved in a direction of an optical axis to thereby focus.

Now, as shown in FIG. 3, as for the movable lens groups, movable lens groups 1 and 2 are secured to lens frames 3 and 4, respectively. Then, the respective movable lens groups 1 and 2 are supported such that the respective optical axis of lenses thereof coincide with each other, with guide bars 8, 9 and 10 being mounted in guide holes 6 and 6 formed in the lens frames 3 and 4 and guide grooves 7 and 7 for bracing.

In order to arrange the lens frames 3 and 4 in a cam tube 11, the lens frames 3 and 4 are inserted into the cam tube 11 in a state where these lens frames 3 and 4 are supported by the guide bars 8, 9 and 10, and cam pins 12 and 13 formed on the lens frames 3 and 4 are coupled into cam grooves 14 and 15 which are formed in the cam tube 11. With this arrangement, by rotating the cam tube 11, the lens frames 3 and 4 are moved back and forth in the direction of the optical axis under a predetermined relationship.

However, in the conventional zoom lens device, the lens frames 3 and 4 should be inserted into the cam tube 11 in an unstable state in which the lens frames 3 and 4 are supported by the guide bars 8, 9 and 10, and further, in this unstable state, the cam pins 12 and 13 should be coupled into the cam grooves 14 and 15, so that such a disadvantage is presented that difficulties are felt in assembling.

Furthermore, the cam tube 11 is inserted into a lens barrel to be assembled in a manner to prevent the lens frames 3 and 4 from falling off, so that such a further disadvantage is presented that still more labor is required for assembling.

SUMMARY OF THE INVENTION

The present invention has been developed to obviate the above-described disadvantages and has as its object the provision of a zoom lens device and a method of assembling the same, wherein zoom lenses can be easily assembled.

To achieve the above-described object, a zoom lens device according to the present invention is characterized in that said zoom lens device comprises a lens housing provided at one side thereof with an opening and having a front lens, a plurality of lens frames each having a lens mounted thereon, a plurality of guide bars for supporting a plurality of lens frames each having mounted thereon with a lens, a side cam tube disposed at one side of the plurality of lens frames and having coupled in cam grooves thereof, cam pins formed on the respective lens frames, and the guide bars for supporting the lens frames and the cam tube are inserted into the lens housing through the opening in a direction perpendicularly intersecting an optical axis.

According to the present invention, first, the guide bars supporting the plurality of lens frames are inserted through the opening formed at the side of the lens housing in the direction perpendicularly intersecting the optical axis, and the guide bars are arranged at predetermined positions in the lens housing. Next, the cam tube is inserted through the above-mentioned opening in the direction perpendicularly intersecting the optical axis and disposed in the lens housing, and the cam pins formed on the lens frames are coupled into the cam grooves formed in the cam tube. With this arrangement, the zoom lenses can be assembled easily as compared with the conventional zoom lens device in which the lens frames in an unstable state of being supported by the guide bars are inserted into the cam tube and disposed therein.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DESCRIPTION OF THE PREFERRED EMBODIMENT

Detailed description will hereunder be given of the preferred embodiment of the zoom lens device according to the present invention with reference to the accompanying drawings.

Figure 1:
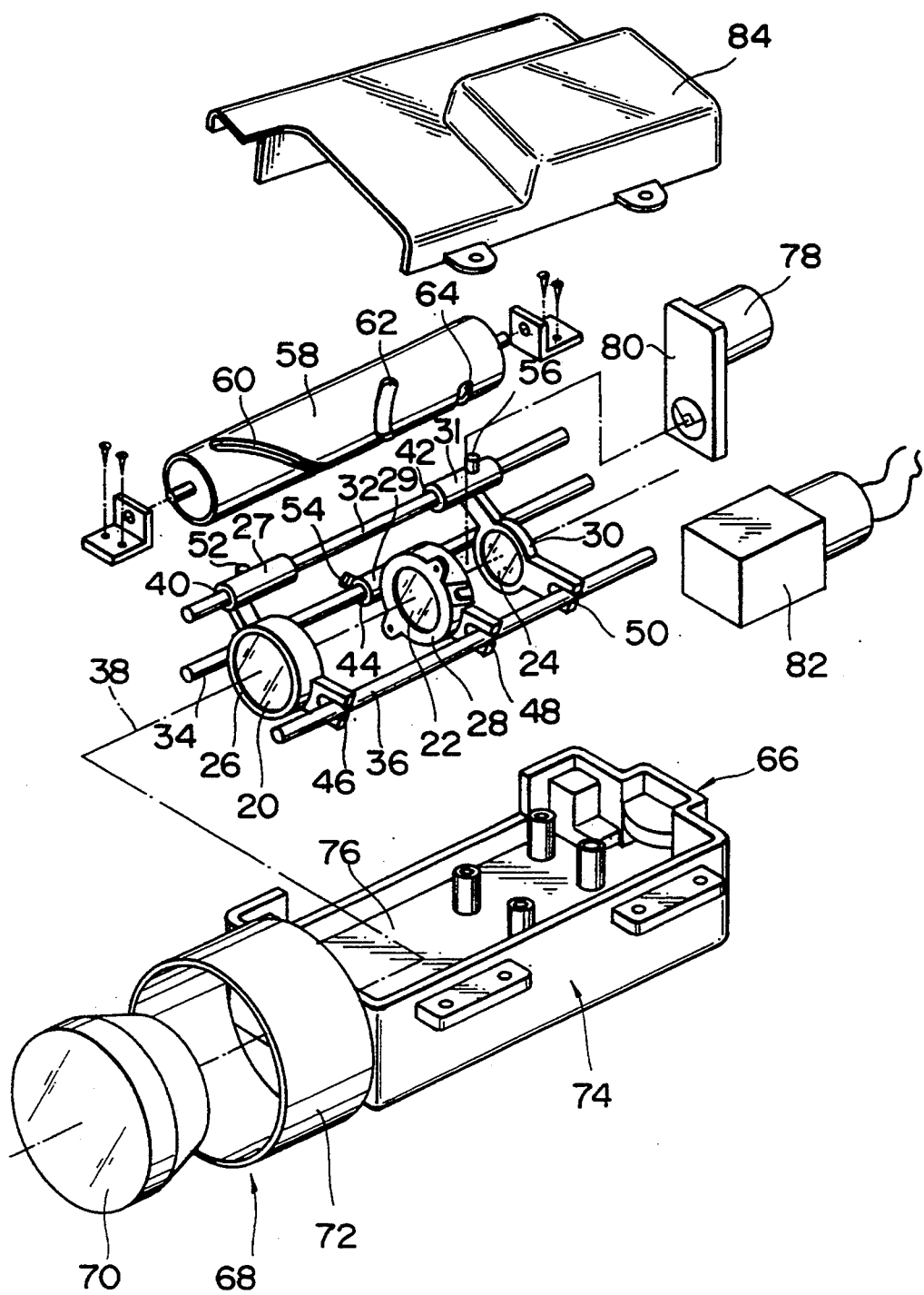
FIG. 1 is a perspective view showing an embodiment of the zoom lens device according to the present invention.

FIG. 1 shows an embodiment of a zoom lens device according to the present invention. Movable lens groups 20, 22 and 24 are secured to lens frames 26, 28 and 30. In FIG. 1, there are shown only respective lenses of the lens groups for convenience. Furthermore, three guide bars 32, 34 and 36 are arranged in parallel to an optical axis 38, and these guide bars 32, 34 and 36 are connected to the lens frames 26, 28 and 30 such that the optical axes of the movable lenses 20, 22 and 24 coincide with one another. That is, the guide bar 32 is inserted through a guide hole 40 of a guide tube 27 formed at one end of the lens frame 26 and a guide hole 42 of a guide tube 31 formed at one end of the lens frame 30, to thereby support the lens frames 26 and 30. Furthermore, the guide bar 34 is inserted through a guide hole 44 of a guide tube 29 formed at one end of the lens frame 28, to thereby support the lens frame 28. Further, the guide bar 36 is inserted through guide grooves 46, 48 and 50 for bracing which are respectively formed on the other ends of the lens frames 26, 28 and 30, to thereby support the lens frames 26, 28 and 30.

Figure 2:
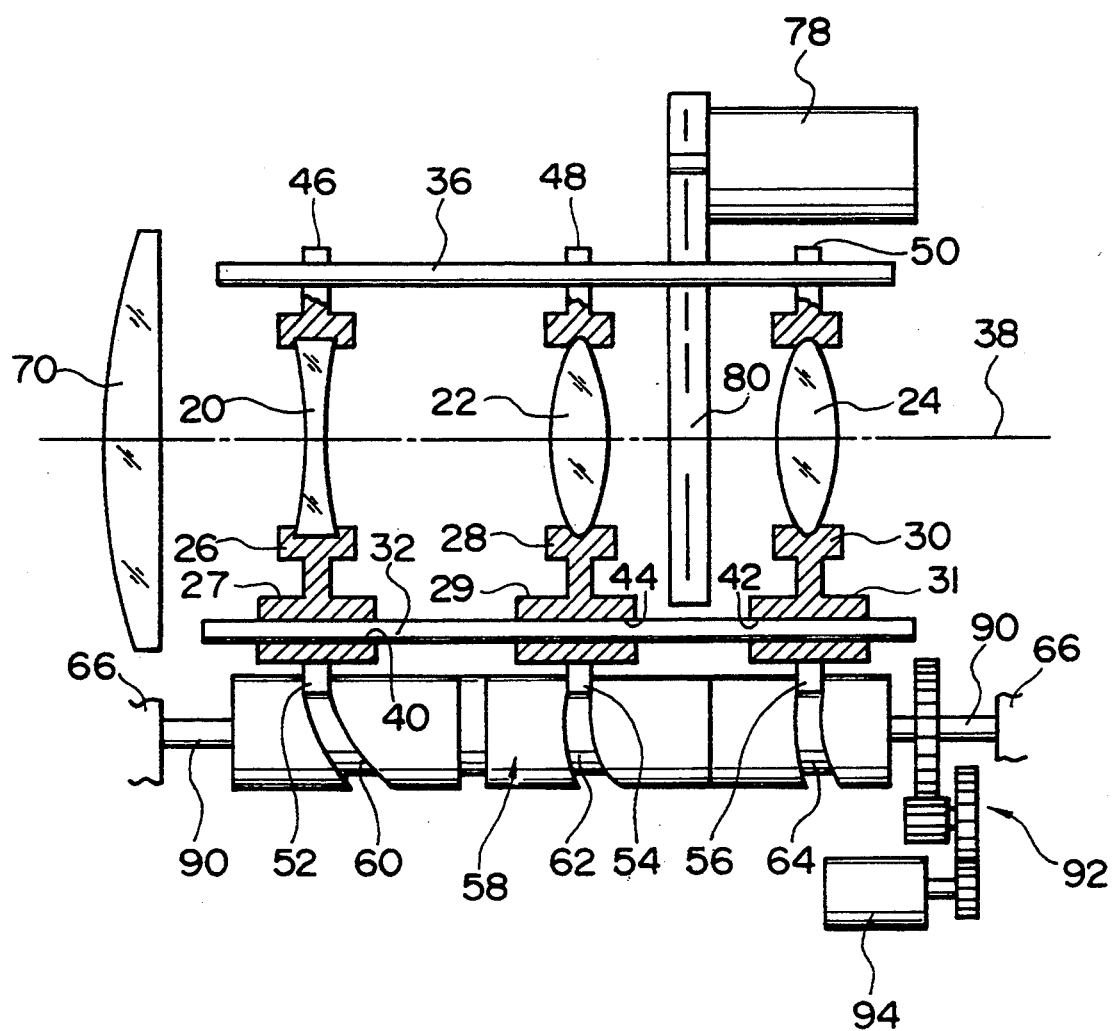
FIG. 2 is a sectional view showing the embodiment of the zoom lens device according to the present invention as shown in FIG. 1.
Figure 3:
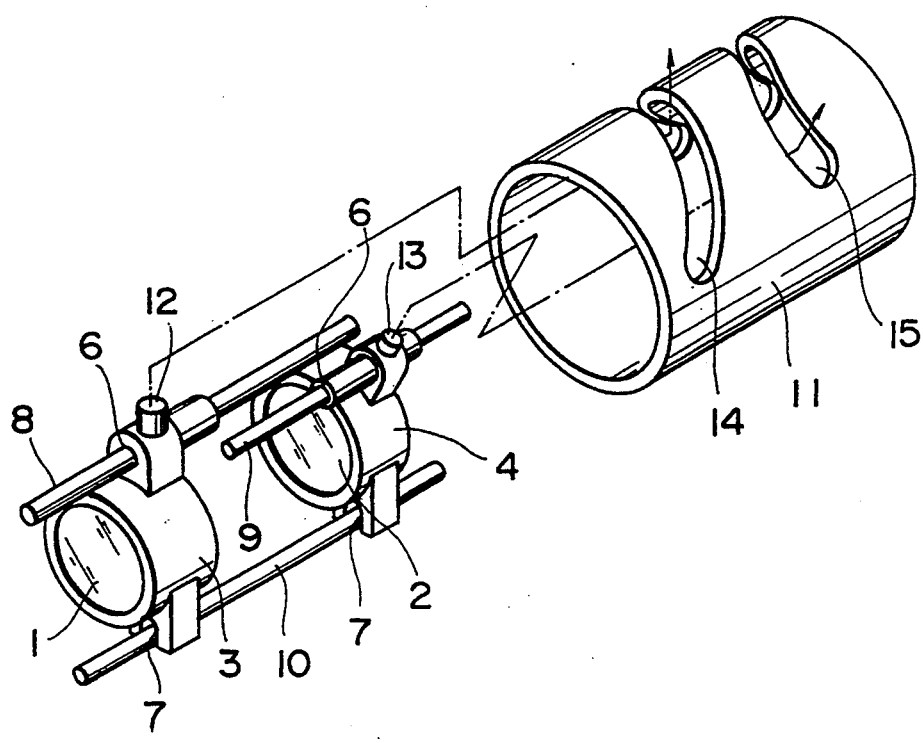
FIG. 3 is a perspective view showing the conventional zoom lens device.

The guide tubes 27, 29 and 31 which are formed on the respective lens frames 26, 28 and 30 are projectingly formed with cam pins 52, 54 and 56, respectively. These cam pins 52, 54 and 56 are respectively coupled into cam grooves 60, 62 and 64 which are formed on a cam tube 58 disposed at the sides of the lens frames 26, 28 and 30. As shown in FIG. 2, the cam tube 58 is supported by a lens housing 66 through shafts 90 and 90 and connected to a zoom motor 94 through a gear mechanism 92. Accordingly, the cam tube 58 is rotated by the zoom motor 94 shown in FIG. 2, so that the lens frames 26, 28 and 30 can be moved back and forth in the direction of the optical axis under a predetermined relationship.

In a front portion 68 of the lens housing 66 of the zoom lenses, there is formed a frame portion 72 for holding a lens 70. Furthermore, a rear half portion 74 of the lens housing 66 is formed to provide a box shape and formed at the side thereof with an opening 76.

The opening 76 is formed to have a size, through which the guide bars 32, 34 and 36 which support the lens frames 26, 28 and 30 and the cam tube 58 can be inserted into the lens housing 66 in the direction perpendicularly intersecting the optical axis.

The steps of assembling the zoom lens device constructed as described above will hereunder be described.

First, the guide bars 32, 34 and 36 which support the lens frames 26, 28 and 30 are inserted through the opening 76 of the lens housing 66 in the direction perpendicularly intersecting the optical axis and arranged at predetermined positions in the lens housing 66.

Next, the cam tube 58 inserted through the opening 76 in the direction perpendicularly intersecting the optical axis and disposed at a predetermined position in the lens housing 66, and the cam pins 52, 54 and 56 which are formed on the lens frames 26, 28 and 30 are coupled into the cam grooves 60, 62 and 64 which are formed in the cam tube 58.

The lens frames supported by guide bars can be more easily assembled with the cam tube following the assembly method and apparatus of the present invention, than can conventional zoom lens devices.

Incidentally, after the cam tube 58 is assembled, an iris diaphragm 80 associated in operation with an iris meter 78 is interposed between the lens groups 22 and 24, and a focus motor 82 is disposed in the lens housing 66. Then, a lid 84 covers the opening 76 of the lens housing 66 and is screwed thereto. With this arrangement, assembling of the zoom lens device requires not much labor and can be performed in a short period of time.

As has been described hereinabove, in the zoom lens device according to the present invention, the guide bars supporting the lens frames and the cam tube are inserted through the opening formed at the side of the lens housing having the lenses in the direction perpendicularly intersecting the optical axis of photographing, so that the zoom lenses can be easily assembled as compared with the conventional zoom lens device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

I claim:

1. A method of assembling a zoom lens device, comprising the steps of:
   (a) inserting guide bars, supporting lens frames of lenses, through an opening in a first side of a lens housing in a direction perpendicularly intersecting an optical axis of the lenses;
   (b) arranging said guide bars at a first predetermined position in said lens housing;
   (c) inserting a cam through said opening in said direction perpendicularly intersecting said optical axis of said lenses; and
   (d) arranging said cam at a second predetermined position in said lens housing such that said cam slidingly engages said lens frames.

2. The method as claimed in claim 1, wherein said step (d) arranges said cam such that cam grooves formed in said cam slidingly engage cam pins projecting from said lens frames.

3. The method as claimed in claim 1, wherein said step (c) inserts a tubular shaped cam through said opening.

4. The method as claimed in claim 1, wherein said step (d) arranges said cam having a longitudinal axis such that said longitudinal axis is parallel to said optical axis.

5. The method as claimed in claim 4, wherein said step (d) arranges said cam such that said longitudinal axis does not coincide with said optical axis.

6. The method as claimed in claim 1, further comprising the steps of:
   (e) arranging an iris between a lens of a first lens frame and a lens of a second lens frame; and
   (f) arranging a lens motor to rotateably drive said cam.

7. The method as claimed in claim 1, wherein said step (a) inserts said guide bars though said opening of said lens housing which is box shaped and has a second side, said second side being perpendicular to said first side and having a lens disposed therein.

8. The method as claimed in claim 7, wherein said step (a) inserts said guide bars through said opening such that said optical axis coincides with an optical axis of said lens disposed in said second side.

9. The method as claimed in claim 1, further comprising the step of (g) attaching a detachable cover over said opening.

* * * * *